(12) United States Patent
Emberty et al.

(10) Patent No.: US 6,600,238 B1
(45) Date of Patent: Jul. 29, 2003

(54) REDUNDANCY AND COMPONENT FAILURE DETECTION WITHIN A SWITCHING POWER SYSTEM

(75) Inventors: Robert George Emberty, Tucson, AZ (US); Eric Y. K. Hew, Tucson, AZ (US); Craig Anthony Klein, Tucson, AZ (US); Gregory Allen Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 09/716,313

(22) Filed: Nov. 20, 2000

(51) Int. Cl.[7] .................................................. H02J 1/00
(52) U.S. Cl. .............................. 307/85; 307/64; 307/70; 307/80
(58) Field of Search ............................. 307/85, 64, 70, 307/80

(56) References Cited

U.S. PATENT DOCUMENTS

| 4,244,277 A | 1/1981 | Avis .............................. 91/459 |
| 4,880,994 A | 11/1989 | Richard ...................... 307/219 |
| 5,256,905 A | 10/1993 | Striek et al. .................. 307/34 |
| 6,172,432 B1 * | 1/2001 | Schackenberg et al. ....... 307/23 |

OTHER PUBLICATIONS

GE SCR Manual, Second Edition, 1961, pp. 196, 197.*

* cited by examiner

Primary Examiner—Brian Sircus
Assistant Examiner—Robert L. Deberadinis
(74) Attorney, Agent, or Firm—Grossman Tucker Perreault & Pfleger, PLLC

(57) ABSTRACT

A redundant power system that includes switch array and component failure detection circuitry is disclosed. The redundant power system includes a plurality of available AC power lines, one of which is coupled to a load through the switch array. A controller instructs the switch array to couple an available AC power line to the load, based upon status information received about the condition of a particular AC power line. Each switch within the switch array includes detection circuitry to determine if the switch has failed, for example, in a stuck closed position.

17 Claims, 6 Drawing Sheets

Redundant Switching (Details)

Stuck Open – Circuit still closed

Stuck Closed – Circuit still open

Analogous Switch

Zero-Crossing Triac Circuit

REDUNDANCY AND COMPONENT FAILURE DETECTION WITHIN A SWITCHING POWER SYSTEM

BACKGROUND OF THE INVENTION

1. Field of the Invention

The present invention relates to circuits and methodology to provide redundancy in a switching power system. More particularly, the present invention provides a redundant switching scheme for AC power that minimizes failed open circuit and closed circuit conditions, and detection circuitry to detect when a switch has failed. The present invention has particular utility in high-power AC redundant switching systems and will be described in reference to such utility, however the present invention has general utility in redundant switching circuits and systems.

2. Description of Related Art

Redundant power switch circuits are known. For example, U.S. Pat. No. 5,256,905 issued to Streich et al. discloses a controller for controlling one or more AC power loads through switch devices such as triacs. The triacs are gated sequentially within each half cycle such that the peak load on the low voltage control circuitry is equal to the load created by gating only a single triac. Distribution of the gating of the triacs is accomplished through the use of a timing circuit or microprocessor, or RC timing circuits having different time constants. Other redundant topologies can be found in U.S. Pat. Nos. 4,880,994 and 4,244,277.

However, in high voltage applications for example, it is an important design consideration in redundant switch systems to determine if and when a particular switch within the switch array has failed in a stuck closed (i.e., short) condition, since a short condition on any one of the switches can produce unwanted high voltage conditions on other portions of a redundant system. Thus, there is a need to provide a redundant switch array that can couple an available AC power line to a load that includes detection circuitry to determine when a switch within the switch array has stuck closed.

SUMMARY OF THE INVENTION

Accordingly, the present invention solves the aforementioned drawbacks of the prior art by providing a redundant switch system including component failure detection circuitry. The switch system includes a redundant switch array to permit continued operation in the event of a failure of one of the switches within the array. The component detection system includes circuitry to indicate that a failure condition exists within the switch array.

In one embodiment, the present invention provides a redundant switch array system, comprising: a plurality of switches formed in a redundant array for coupling an available power line to a load; a switch controller generating a switch control signal for instructing each said switch open or close based on the availability of said power line; and detection circuitry coupled to each said switch for detecting the conduction state of each said switch and generating a detection signal to said controller if said switch is conducting.

In another embodiment, the present invention provides a redundant switch system including component failure detection circuitry, comprising: a plurality of AC power lines; a switch array comprising a plurality of redundant switches for coupling one of said AC power lines to a load; a switch controller generating a switch control signal for instructing each said switch open or close based on the availability of said AC power lines; and detection circuitry coupled to each said switch for detecting the conduction state of each said switch and generating a detection signal to said controller if said switch is conducting.

In system level embodiment, the present invention provides a redundant switch system including component failure detection circuitry, comprising: a plurality of AC power lines; a switch array comprising a plurality of redundant triac switches for coupling one of said AC power lines to a load; a switch controller generating a switch control signal for instructing each said switch open or close based on the availability of said AC power lines; and detection circuitry coupled to each said switch for detecting the conduction state of each said switch and generating a detection signal to said controller if said switch is conducting, and each said detection circuitry coupled in parallel to said triac circuit, said triac switch generating a leakage current across said detection circuitry when said switch is open, said detection circuitry generating a detection signal based upon the absence of said leakage current, wherein said controller receiving said detection signal and comparing said detection signal to said switch control signal to determine if a given one of said switches is stuck in a closed position.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
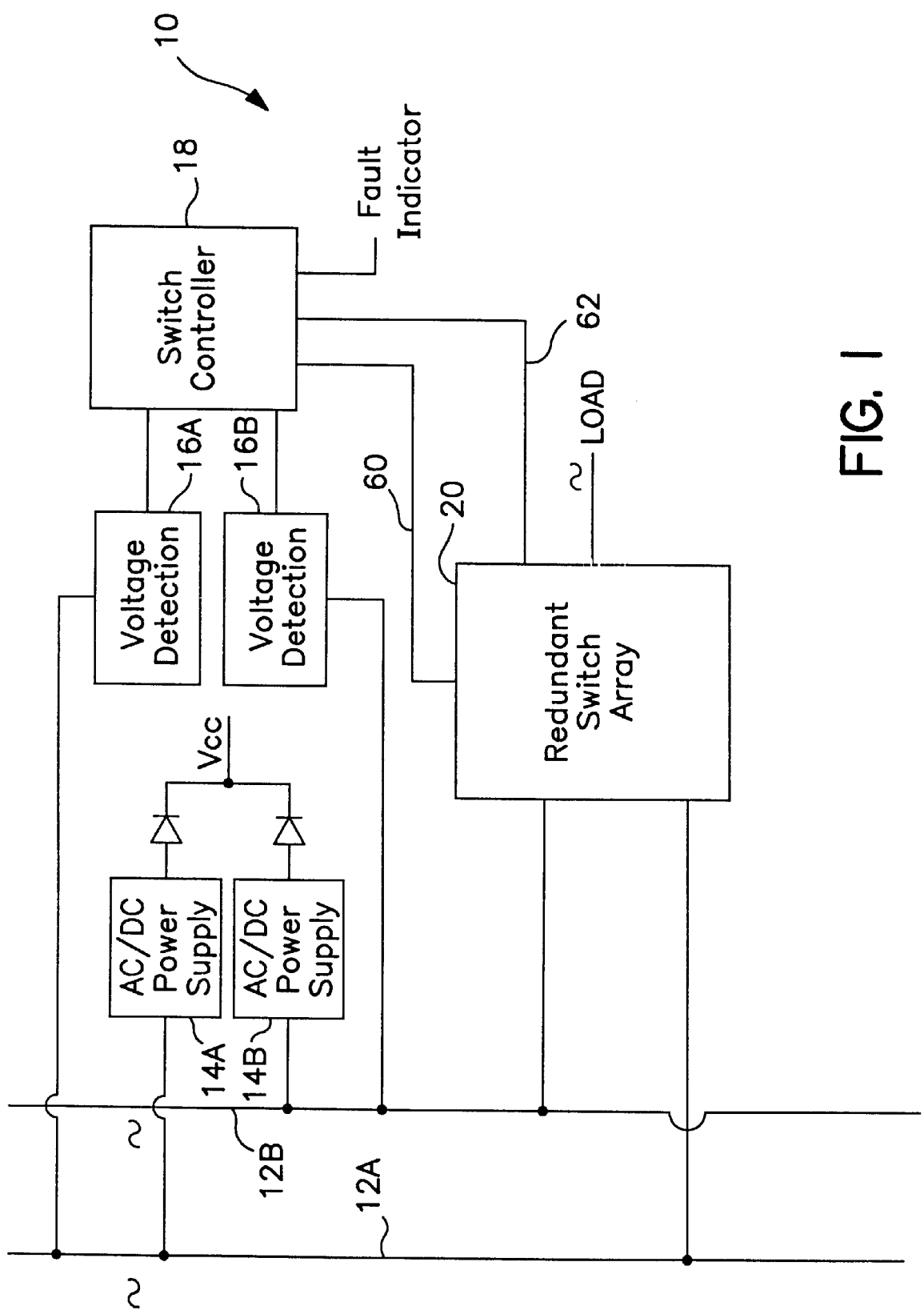
FIG. 1 is a block diagram representation of a redundant power supply system according to the present invention.

FIG. 1 depicts a system-level block diagram of the redundant component failure detection system 10 of the present invention. In FIG. 1, and the figure to follow, the present invention shall be described in reference to two available AC power lines, one of which is redundant, and various redundant power components. It should be understood at the outset that the present invention is not limited to a single redundant system, rather the system described herein may be duplicated in all or in part to accommodate multiple redundant power lines.

As shown in FIG. 1, each component of the system 10 is redundant. The system 10 includes AC/DC power supplies 14A and 14B, each coupled to the power line 12A and 12B respectively. The output DC voltage is dot Ored and used to supply power to the voltage detection circuits 16A, 16B and/or the switch controller 18. Voltage detection circuits monitor the presence of power on a respective power line 12A or 12B, and instruct the switch controller to couple the switch array 20 to one or the other available power lines. The switch controller generates a switch control signal 60 to the switch array 20 to instruct the plurality of redundant switches of the switch array to couple a load to one or the other available power lines. As will be described below, the present invention also includes detection circuitry to detect a failure condition on one or more of the switches in the switch array. Such a failure condition is reported to the controller via detection signal 62.

Figure 2:
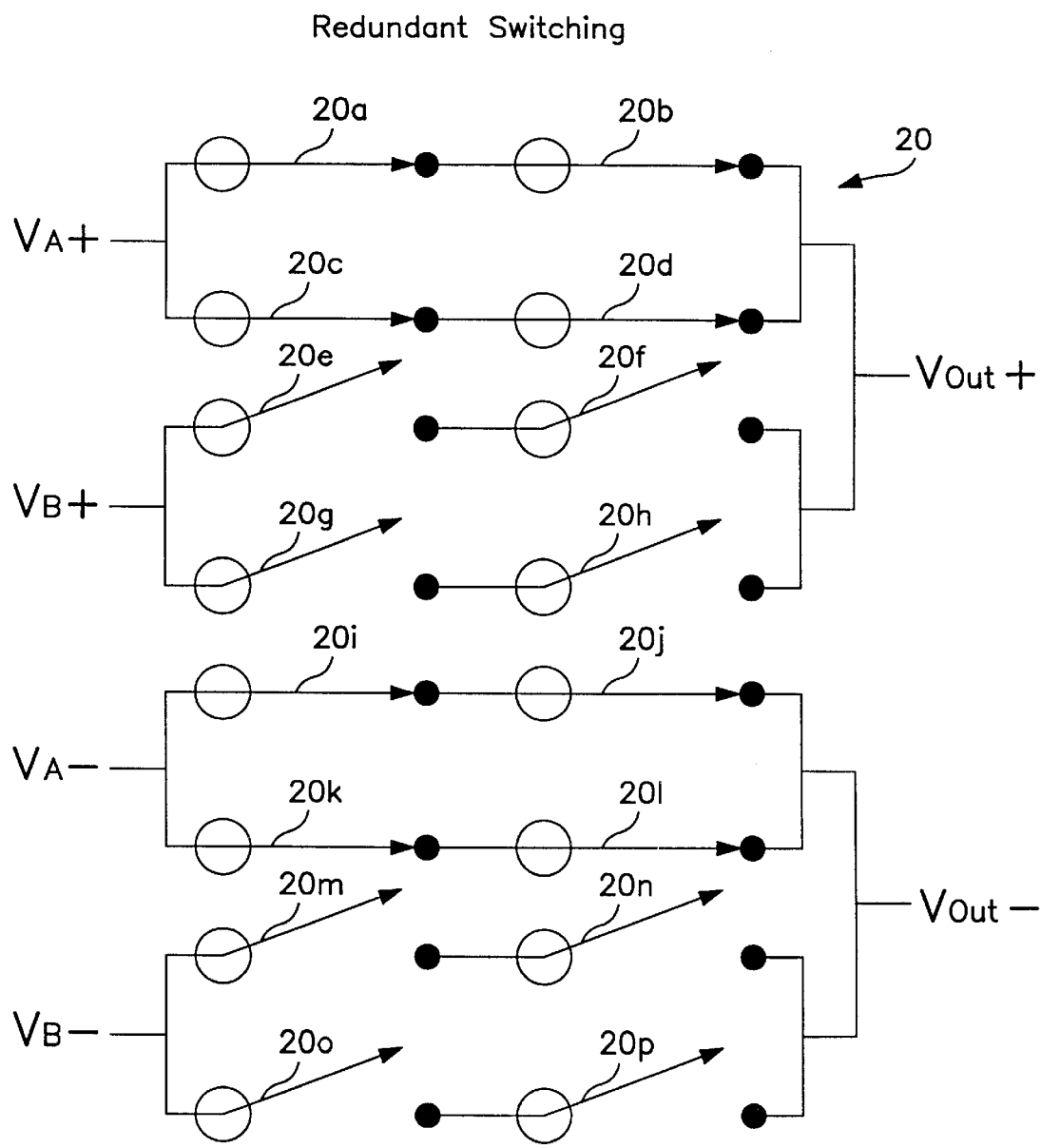
FIG. 2 is an exemplary diagram of a redundant switch array according to the present invention.
Figure 3A:
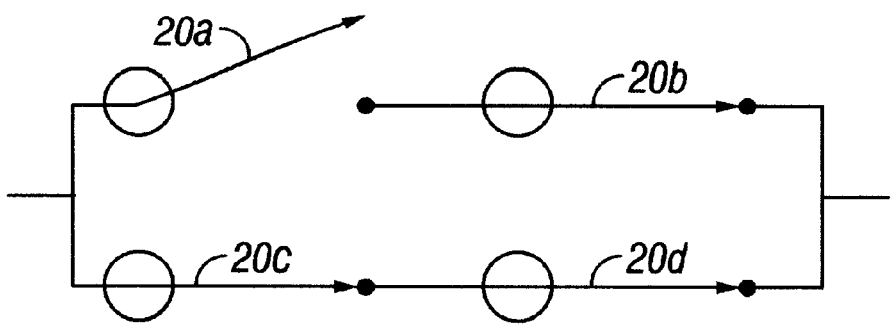
FIGS. 3A and 3B are exemplary diagrams of failure conditions that may exist in the redundant switch array of the present invention.
Figure 3B:
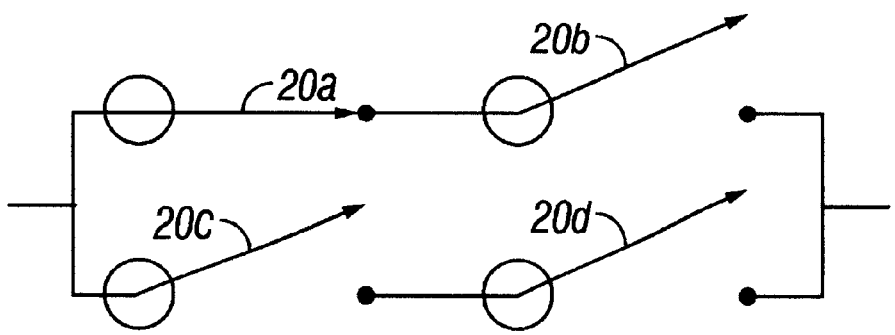

FIG. 2 is an exemplary switch array according to the present invention. In this example, a plurality of redundant switches 20a–20p are provided to couple a power line VA+/VA— or VB+/VB— to the load. For each line, the switches 20a–20p are arranged as two switches in series, in parallel with two other switches in series, as shown. In this manner, a failure of any one of the switches will not disrupt connect or disconnection between the line and the load. Of course, further redundancy may be added. FIGS. 3A and 3B depict a failure condition where one of the switches fails open and closed, respectively. In FIG. 3A, assume that switch 20a has failed in an open (non-conducting) state. Redundant switches 20c and 20d are available to complete the circuit. Similarly, in FIG. 3B, assume switch 20a has failed in a closed (conducting) state. Switches 20b, 20c and 20d remain available to open the circuit.

Figure 4A:
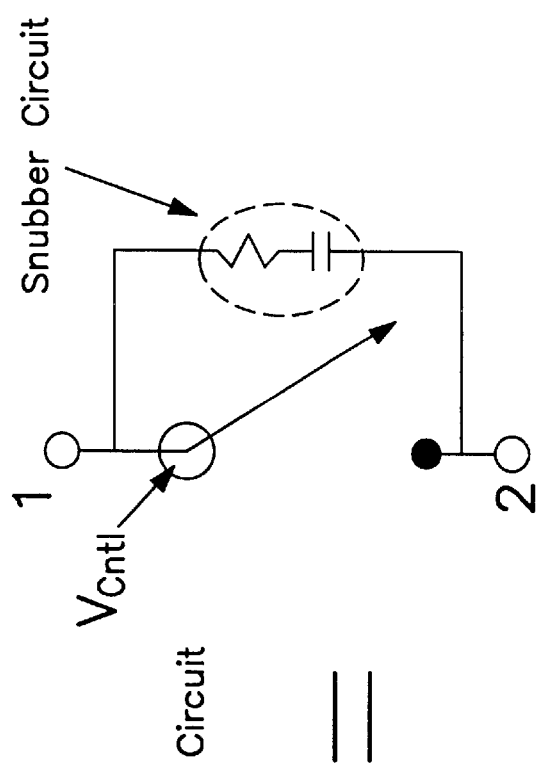
FIG. 4A is an equivalent circuit of the switch of FIG. 4.
Figure 4:
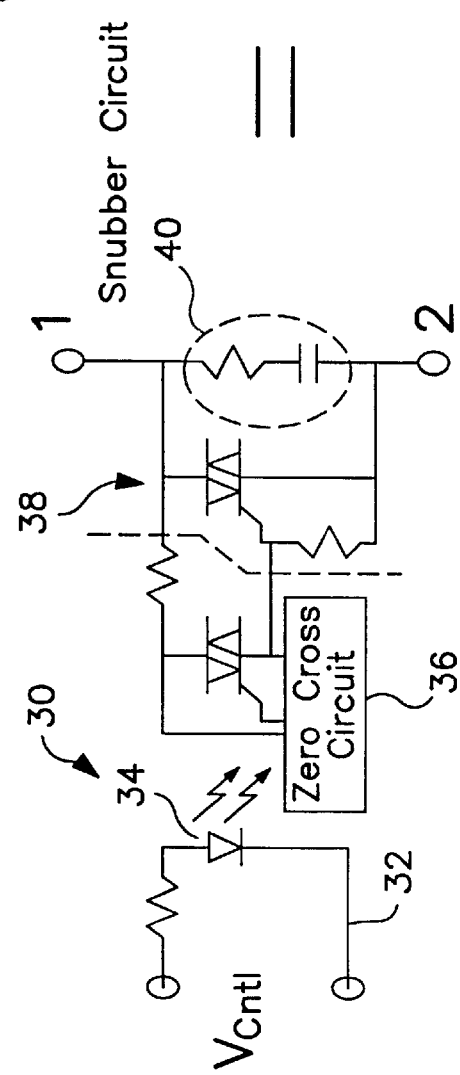
FIG. 4 is an example a conventional triac switch.

FIG. 4 depicts a conventional zero-crossing triac switch circuit 30 which may be utilized (as modified and described below) in the switch array of the present invention. The switch circuit 30 includes a control gate portion 32 that couples optically, via optical transmitter element 34, to a zero crossing circuit 36. The state of the triac 38 is controlled by the signal value generated by the control signal and the zero crossing circuit. Snubber circuit 40 includes an RC circuit, as shown, to filter high frequency noise during switching. The conduction state of the switch is controlled by the appropriate control signal generated by the switch controller 18 shown in FIG. 1. The equivalent switch is shown in FIG. 4A.

Figure 5:
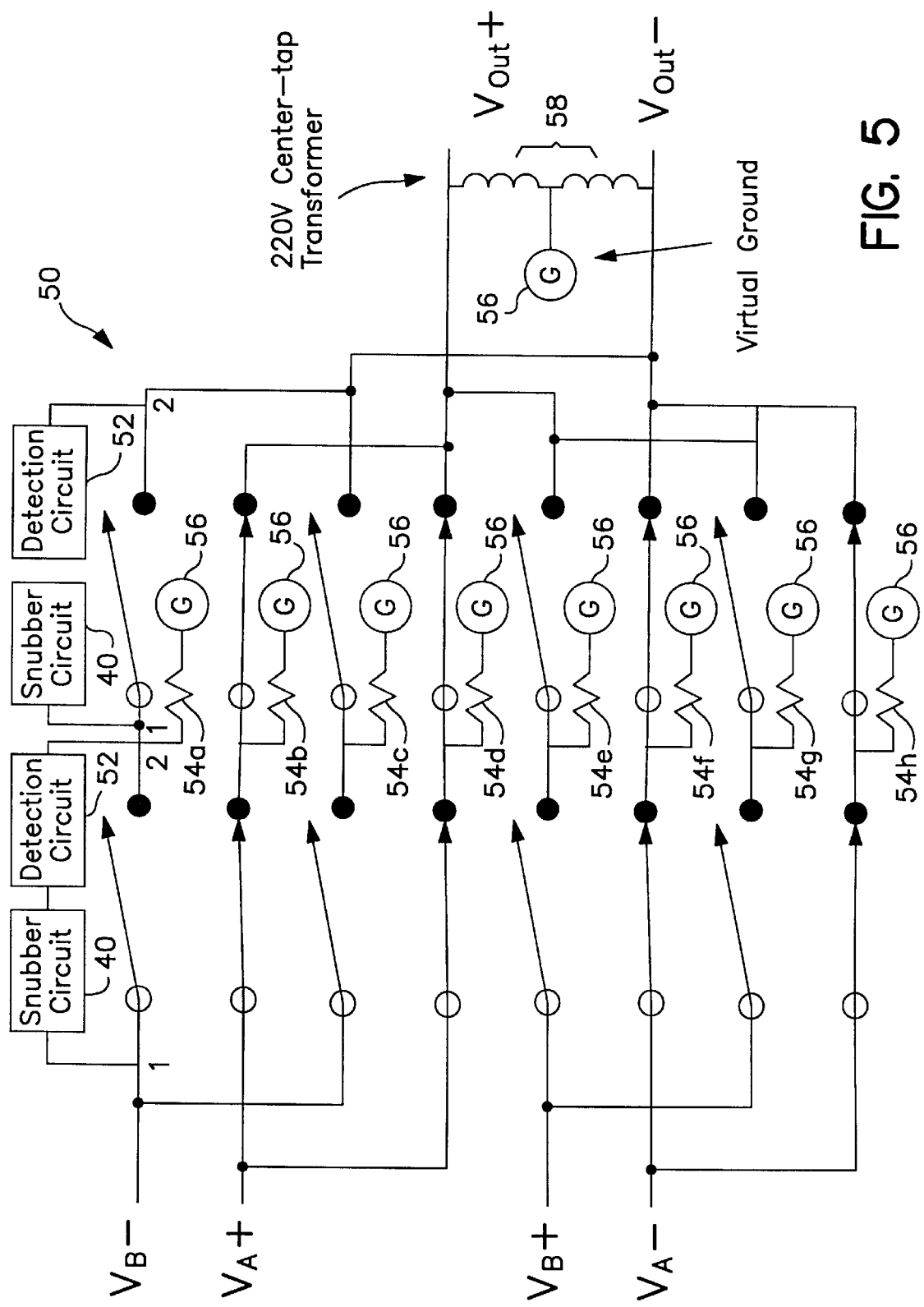
FIG. 5 is another exemplary diagram of a redundant switch array according to the present invention.

The present invention modifies the switching array shown in FIG. 2 and the switch 30 shown in FIG. 4 to detect the presence of a failed switch, such as shown in FIGS. 3A and 3B. More particularly, the present invention provides a detection mechanism to detect a failed-closed switch. FIG. 5 depicts a switch array 50 according to the present invention. In this topology, each switch 20a–20p is modified to include a detection circuit 52 in series with the snubber circuit 40 shown in FIGS. 4 and 4A. Additionally, a shunt impedance 54a–54h is placed between the two series switches of each power leg, as shown. Each shunt impedance is coupled to a virtual ground G 56, to complete the detection circuit 52 to a reference voltage. In the example, the virtual ground is not true ground so that a short-circuit condition does not occur when the switch is closed. Rather, the virtual ground is a lower potential to permit a voltage drop across the shunt impedance 54a–54h when the switch is open. The impedance 54a–54h is common to both switches of each leg. The virtual ground 56 in the example of FIG. 5 is a reference voltage provided by a transformer 58. The reference voltage may be chosen at the middle point of the transformer, i.e., 0 volts. The use of shunt resistors ensures that at least a leakage current is shunted across the switches when the switch is OFF (nonconducting). Accordingly, the shunt resistor should have a large enough resistance value to have a negligible effect on the overall dynamics of the switching system.

Figure 6:
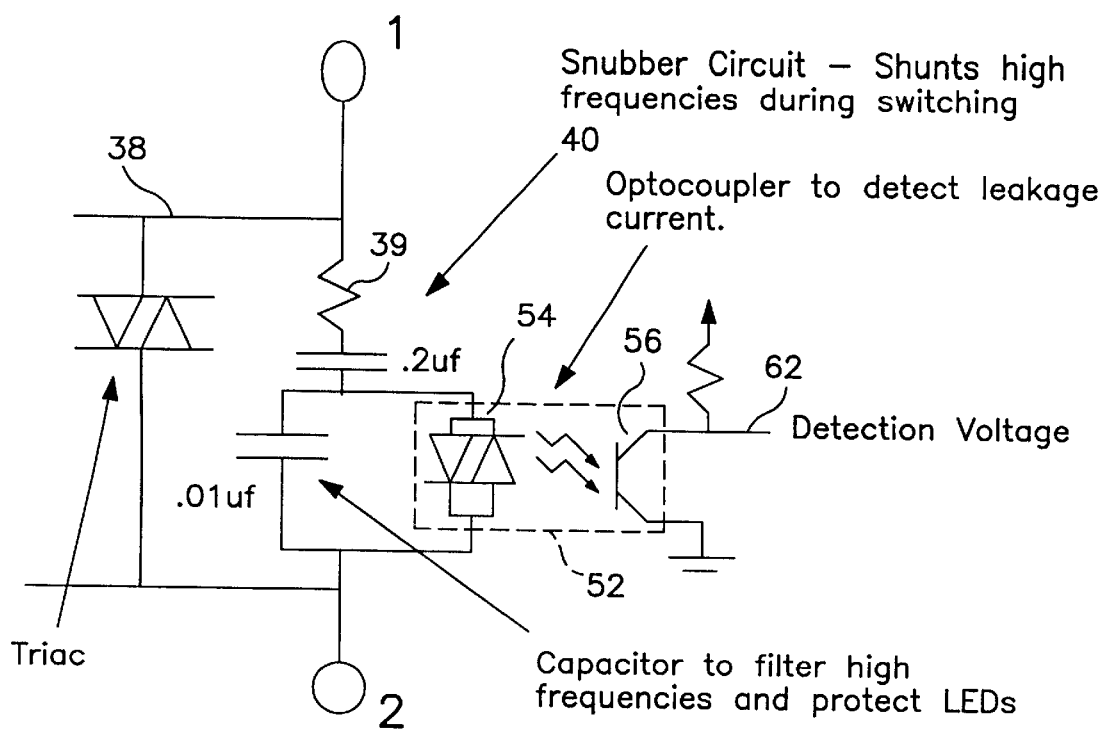
FIG. 6 is an example of a modified switch including detection circuitry according to the present invention.

FIG. 6 depicts a zero-crossing triac switch circuit 60 according to an example of the present invention. In this example, the triac circuit 40 is modified with the detection circuit 52 that detects the presence of a leakage current through the snubber circuit 40 when the switch is opened. The detection circuit depicted includes an opticoisolated LED emitter 54 and an optically activated switch 56. When one triac 38 of a given leg is stuck OFF (nonconducting), there exists no leakage current through the snubber circuit 40 and detection circuit, since the remaining redundant switches for that leg are ON (conducting). Likewise, when the triac 38 has failed ON (closed), the leakage current does not flow through the snubber circuit or the detection circuit. By comparing the switch control signal 60 for a given switch with that of the detection circuit signal 62 a failed closed condition can thus be detected. To that end, switch controller 18 is adapted to include appropriate circuitry to compare signal 60 with signal 62 to determine a failure of one (or more) of the switches in the switch array. The switch controller compares the detection signal with the switch control signal, and if the control signal indicates that a given switch is to be open but the detection signal indicates that a switch is closed, a failure condition is noted. Of course, the switch controller may include a latch circuit (not shown) to latch the failure condition until the controller is reset. The controller 18 may also include a fault indicator (e.g., LED) to provide visual indication that a switch has failed in a stuck closed position.

In certain implementations, the switches of a particular leg, for example switches 20a–20d, may be integrally formed on a single replaceable printed circuit board. Replacement of a failed switch in this implementation would typically mean replacement of the entire circuit board (i.e., all redundant switches for that leg get replaced). In other implementations, each switch may be connected to the circuit individually, and may be replaced individually.

In some exemplary embodiments, switch controller 20 may comprise a general-purpose microprocessor programmed to instruct the switches of the redundant switching array 20 based on the value of the detect signals generated by the voltage detection circuits 16A and 16B. Of course, controller 20 may alternatively comprise a state machine logic controller to accomplish the same result. Redundant switch array may comprise a plurality of redundant triac switches (as described and modified herein), relay switches, or other high voltage switch mechanisms known in the art, all of which are deemed as equivalents and are within the scope of the present invention. Voltage detection circuits 16A and 16B include circuitry to detect the presence and condition of the power signal on power lines 12A and 12B, respectively, and may further provide detection of a failure condition of a power line within a predetermined time frame. The detection circuit embodied herein is more fully described and claimed in U.S. Pat. application Ser. No. 09/716,750, assigned to the same assignee. It should be understood that this is only an exemplary implementation, and such an implementation is not to be construed as limiting the present invention, and is provided only as one of many implementations that may be realized with the power interruption detection circuits of the present invention. Those skilled in the art will further recognize that numerous modifications may be made to the present invention, and all such modifications are deemed within the scope of the present invention, only as limited by the appended claims.

What is claimed is:

1. A redundant switch array system, comprising:

a plurality of switches formed in a redundant array for coupling an available power line to a load;

a switch controller generating a switch control signal for instructing each said switch open or close based on the availability of said power line; and detection circuitry coupled to each said switch for detecting the conduction state of each said switch and generating a detection signal to said controller if said switch is conducting; each said switch comprising a triac circuit, and each said detection circuitry coupled in parallel to said triac circuit, said triac switch generating a leakage current across said detection circuitry when said switch is open, said detection circuitry generating a detection signal based upon the absence of said leakage current.

2. A system as claimed in claim 1, wherein said redundant array comprising four of said switches coupled to each leg of each said available power line, said four switches of each said leg formed as two sets of series switches in parallel.

3. A system as claimed in claim 1, further comprising a voltage detection circuit coupled to each said power line, said voltage detection circuit monitoring the presence of a respective power line and generating a signal to said controller indicative of the presence of said respective power line.

4. A system as claimed in claim 3, wherein said controller receiving said signal indicative of the presence of said respective power line from each said voltage detection circuit and generating said control signal to said switch array to couple an available power line to a load.

5. A system as claimed in claim 1, wherein said controller receiving said detection signal and comparing said detection signal to said switch control signal to determine if a given one of said switches is stuck in a closed position.

6. A system as claimed in claim 1, said triac circuit further comprising a snubber circuit to filter noise during switching.

7. A system as claimed in claim 6, wherein said snubber circuit in series with said detection circuit and comprising an RC circuit.

8. A system as claimed in claim 1, wherein said detection circuit comprising opticoisolated LED emitter and an optically activated switch, said emitter receiving said leakage current and generating an emitted signal to said optically activated switch.

9. A system as claimed in claim 1, further comprising an AC/DC power supply coupled to each said power line and generating a DC voltage for operation of said switch controller.

10. A system as claimed in claim 1, wherein said switch array further comprises a shunt resistor coupled between each pair of serially connected switch and a virtual ground, said virtual ground providing a reference voltage for said detection circuit.

11. A system as claimed in claim 10, said virtual ground comprising a center tap of a transformer circuit to generate said reference voltage, said reference voltage and said shunt resistor insufficient to cause a short when said switch is closed.

12. A redundant switch system including component failure detection circuitry, comprising:

a plurality of AC power lines;

a switch array comprising a plurality of redundant triac switches for coupling one of said AC power lines to a load;

a switch controller generating a switch control signal for instructing each said switch open or close based on the availability of said AC power lines; and detection circuitry coupled to each said switch for detecting the conduction state of each said switch and generating a detection signal to said controller if said switch is conducting, and each said detection circuitry coupled in parallel to said triac circuit, said triac switch generating a leakage current across said detection circuitry when said switch is open, said detection circuitry generating a detection signal based upon the absence of said leakage current, wherein said controller receiving said detection signal and comparing said detection signal to said switch control signal to determine if a given one of said switches is stuck in a closed position.

13. A system as claimed in claim 12, wherein said redundant array comprising four of said triac switches coupled to each leg of each said available power line, said four triac switches of each said leg formed as two sets of series switches in parallel.

14. A system as claimed in claim 12, further comprising a voltage detection circuit coupled to each said power line, said voltage detection circuit monitoring the presence of a respective power line and generating a signal to said controller indicative of the presence of said respective power line.

15. A system as claimed in claim 14, wherein said controller receiving said signal indicative of the presence of said respective power line from each said voltage detection circuit and generating said control signal to said switch array to couple an available power line to a load.

16. A system as claimed in claim 12, wherein said detection circuit comprising opticoisolated LED emitter and an optically activated switch, said emitter receiving said leakage current and generating an emitted signal to said optically activated switch.

17. A system as claimed in claim 12, wherein said switch array further comprises a shunt resistor coupled between each pair of serially connected switches, and a virtual ground, said virtual ground providing a reference voltage for said detection circuit, said virtual ground comprising a center tap of a transformer circuit to generate said reference voltage, said reference voltage and said shunt resistor insufficient to cause a short when said switch is closed.

* * * * *